United States Patent
Takahashi et al.

(10) Patent No.: US 7,218,340 B2
(45) Date of Patent: May 15, 2007

(54) VIDEO-SCOPE IN ELECTRONIC ENDOSCOPE APPARATUS

(75) Inventors: Tadashi Takahashi, Saitama (JP); Tsutomu Takizawa, Tokyo (JP); Mitsuru Iida, Saitama (JP)

(73) Assignee: PENTAX Corporation, Tokyo (JP)

( * ) Notice: Subject to any disclaimer, the term of this patent is extended or adjusted under 35 U.S.C. 154(b) by 799 days.

(21) Appl. No.: 10/350,193

(22) Filed: Jan. 24, 2003

(65) Prior Publication Data

US 2003/0142205 A1 Jul. 31, 2003

(30) Foreign Application Priority Data

Jan. 25, 2002 (JP) .......................... P2002-016496

(51) Int. Cl.
*H04N 7/18* (2006.01)
*A61B 1/00* (2006.01)

(52) U.S. Cl. ........................................ 348/65; 600/117
(58) Field of Classification Search .................. 348/65, 348/68, 77; 600/117, 118, 180
See application file for complete search history.

(56) References Cited

U.S. PATENT DOCUMENTS

| | | | |
|---|---|---|---|
| 4,503,841 A * | 3/1985 | Tsukaya et al. | ............. 600/118 |
| 6,215,517 B1 | 4/2001 | Takahashi et al. | |
| 6,313,868 B1 * | 11/2001 | D'Alfonso et al. | ........... 348/72 |
| 6,436,032 B1 * | 8/2002 | Eto et al. | ..................... 600/117 |
| 6,524,236 B2 * | 2/2003 | Honda et al. | ............... 600/180 |
| 2003/0160865 A1 * | 8/2003 | Takahashi | ..................... 348/65 |

FOREIGN PATENT DOCUMENTS

JP       2002-369798       12/2002

* cited by examiner

*Primary Examiner*—Gims Philippe
(74) *Attorney, Agent, or Firm*—Greenblum & Bernstein, P.L.C.

(57) ABSTRACT

A video-scope according to the present invention has an image sensor and is selectively connectable to plural types of video-processors. The video-scope has a memory, a signal processor, a video-processor detector, and a data setter. The memory stores a series of register setting data, which is associated with signal processes for image signals, read from the image sensor, and which corresponds to the plural types video-processors. The signal processor is provided in the video-scope and processes the image signals. The video-processor detector detects the type information of the connected video-processor. Then, the data setter reads the register setting data corresponding to the detected type information from the memory, and writes the register setting data in a register provided in the signal processor. The signal processor processes the image signals in accordance with the register setting data in the register.

12 Claims, 3 Drawing Sheets

| CODE | VIDEO-PROCESSOR |
|---|---|
| $10_H$ | $VP-I_{00}$ |
| $11_H$ | $VP-I_{01}$ |
| $20_H$ | $VP-II_{00}$ |
| $30_H$ | $VP-III_{00}$ |

VIDEO-SCOPE IN ELECTRONIC ENDOSCOPE APPARATUS

BACKGROUND OF THE INVENTION

1. Field of the Invention

The present invention relates to an electronic endoscope apparatus for observing an internal organ, which has a video-scope with an image sensor and a video-processor. Especially, it relates to a data-setting process for a signal processing circuit that processes image signals read from an image sensor.

2. Description of the Related Art

In recent electronic endoscope apparatus including a video-scope with an image sensor and a video-processor, a signal processing circuit for processing image signals, which are read from the image sensor, is provided in the video-scope, wherein an R, G, B gain control, a gamma correction, contour emphasizing process, color difference signal generating process, and so on, are performed. Data associated with the signal processes, such as R, B gain values and a gamma value, is stored in a memory in advance. When performing an initial setting for the electronic endoscope apparatus, the data is read from the memory and is written in a register provided in the signal processing circuit. The signal processing circuit processes the image signals in accordance with the data in the register.

On the other hand, plural types of video-processors have been produced, and each type video-processor has peculiar characteristics, for example, the lamp characteristic and the characteristics of the collecting optical system provided between the lamp and the fiber-optic bundle. Accordingly, when the data stored in the register is not suitable for the type of connected video-processor, the color subject image cannot be properly reproduced on a monitor.

SUMMARY OF THE INVENTION

Therefore, an object of the present invention is to provide a video-scope in an electronic endoscope apparatus that performs signal processes suitable for a connected video-processor.

A video-scope according to the present invention has an image sensor and is selectively connectable to plural types video-processors. The video-scope has a memory, a signal processor, a video-processor detector, and a data setter. The memory stores a series of register setting data, which is associated with signal processes for image signals read from the image sensor, and which corresponds to the plural types video-processors. The signal processor is provided in the video-scope and processes the image signals. The video-processor detector detects the type information of a connected video-processor. Note that, the type information includes at least one of the primary type number of the plural types of video-processors, and the version number of the plural types of video-processors. Then, the data setter reads register setting data corresponding to the detected type information from the memory, and writes the register setting data in a register provided in the signal processor. The signal processor processes the image signals in accordance with the register setting data in the register.

An apparatus for setting data according to another aspect of the present invention sets data associated with signal processes performed in a video-scope of an electronic endoscope apparatus. The apparatus has a memory that stores a series of register setting data, which is associated with the signal processes, and which corresponds to plural types of video-processors; a video-processor detector that detects the type information of a connected video-processor; and a data setter that reads register setting data corresponding to the detected type information from the memory, and that writes the register setting data in a register in a signal processor that processes image signals read from an image sensor provided in the video-scope. The signal processor processes the image signals in accordance with the register setting data in the register.

A method for setting data according to another aspect of the present invention sets data associated with signal processes performed in a video-scope of an electronic endoscope apparatus. The method includes steps of: detecting the type of a connected video-processor; reading register setting data corresponding to the detected type information from a memory that stores a series of register setting data, which is associated with the signal processes and which corresponds to plural types of video-processors; and writing the register setting data on a register in a signal processor that processes image signals read from an image sensor provided in the video-scope. The signal processor processes the image signals in accordance with the register setting data in the register.

BRIEF DESCRIPTION OF THE DRAWINGS

The present invention will be better understood from the description of the preferred embodiment of the invention set fourth below together with the accompanying drawings, in which.

DESCRIPTION OF THE PREFERRED EMBODIMENTS

Hereinafter, the preferred embodiment of the present invention is described with reference to the attached drawings.

Figure 1:
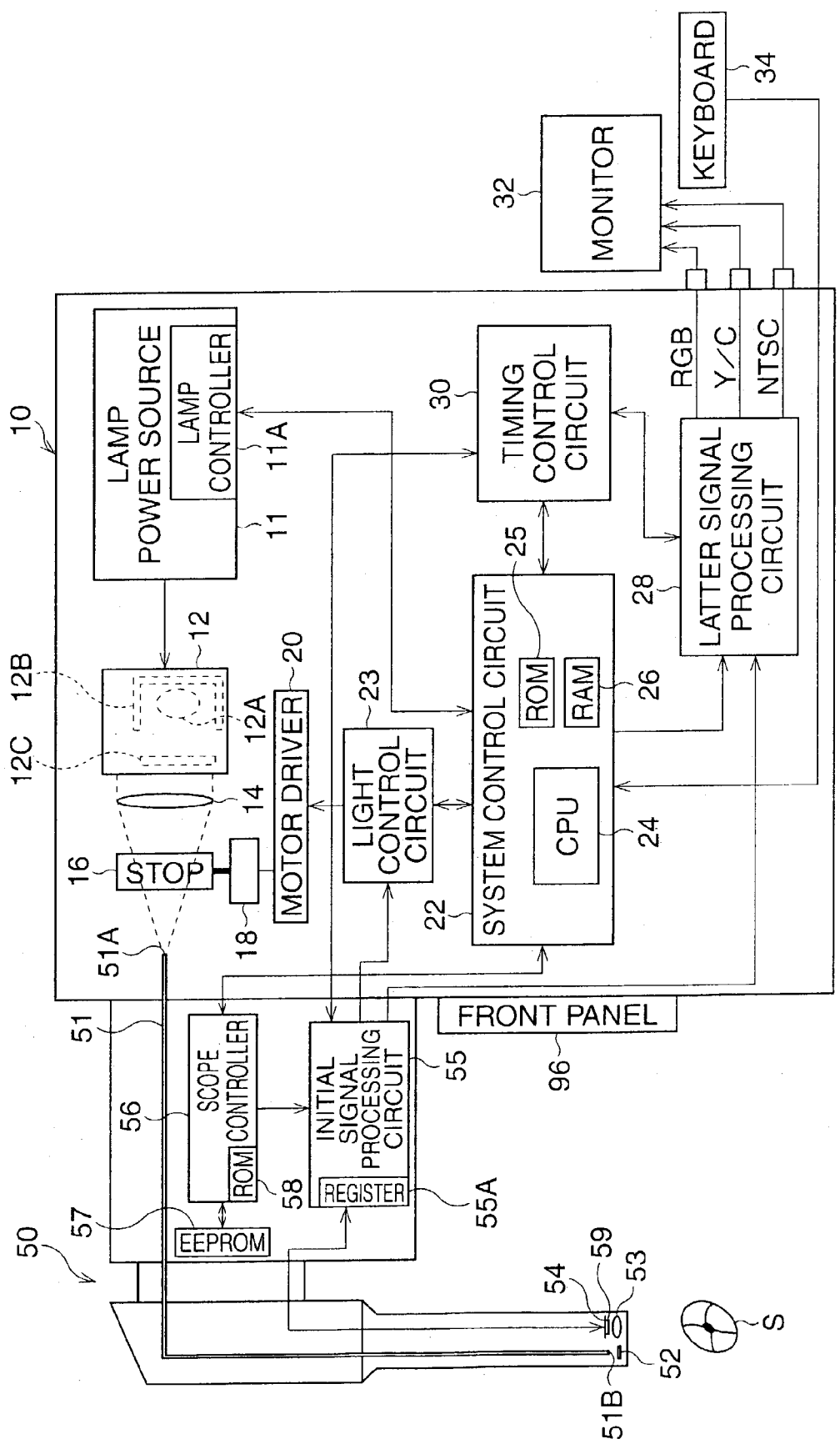
FIG. 1 is an electronic endoscope apparatus according to the embodiment.

FIG. 1 is an electronic endoscope apparatus according to the present embodiment.

The electronic endoscope apparatus has a video-scope 50 with a CCD (Charge-Coupled Device) 54 and a video-processor 10. The video-scope 50 is detachably connected to the video-processor 10, and further a monitor 32 and keyboard 34 are connected to the video-processor 10.

A lamp unit 12 for illuminating a subject S is provided in the video-processor 10. When a lamp switch provided on the video-processor 10 (not shown) is turned ON, electric power is supplied from a lamp power source 11 including a lamp controller 11A to the lamp unit 12. The lamp unit 12 has a lamp 12A, such as a xenon lamp, a collecting mirror 12B, and an infrared-ray absorption filter 12C. The lamp 12A is turned ON by supplying electric power, and light emitted from the lamp 12A, is directed toward an incident surface 51A of a fiber-optic bundle 51 via a collecting lens 14. The fiber-optic bundle 51, provided through the video-scope 40, further directs the light to the distal end of the video-scope 50. The light passing through the fiber-optic bundle 51 exits from an end surface 51B of the fiber-optic bundle 51, and is emitted toward the subject S via a diffusion lens 52, so that the subject S is illuminated.

The light reflected on the subject S passes through an objective lens 53 and reaches the CCD 54, so that the subject image S is formed on a photo-sensor area of the CCD 54. For the color imaging process, in this embodiment, an on-chip color filter method using an on-chip color filter is applied. A color filter 59, checkered by four color elements of Yellow (Y), Magenta (Mg), Cyan (Cy), and Green (G), is arranged on the photo-sensor area of the CCD 54 such that the four color elements are opposite to the pixels arranged in the photo-sensor area. Color image signals, corresponding to light passing through the color filter 59, are generated in the CCD 54 by the photoelectric transform effect. The generated color image signals are composed plural color signal components. Then, one field worth of image signals is read from the CCD 54 at regular time intervals in accordance with the so called "color difference line sequential system". In this embodiment, the NTSC standard is used as the color TV standard, accordingly, one field worth of image signals is read from the CCD 54 at 1/60 second time intervals, and then fed to an initial signal processing circuit 55, which is constructed as an IC (Integrated Circuit) chip.

The initial signal processing circuit 55 has amplifiers for amplifying the image signals read from the CCD 54, a separating circuit for separating the image signals into initial luminance signals and initial chrominance signals, a R, G, and B matrix circuit for generating primary color signals composed of Red (R), Green (G), and Blue (B) color element signals from the initial luminance and chrominance signals, a gain control circuit for adjusting the ratio of the R, G, B signals, a gamma correcting circuit for performing the gamma correction, a contour emphasizing circuit for emphasizing the image contour, and a color matrix circuit for generating luminance signals and color difference signals (all not shown). Then, various processes are performed for the image signals in the initial signal processing circuit 55, so that video signals including luminance signals and color difference signals are generated. Further, a timing generator (not shown) that outputs clock pulses for driving the CCD 54 and clock pulses for adjusting an input and output timing to the image signals, is provided in the initial signal processing circuit 55. The generated luminance signals and the color difference signals are fed to a latter signal processing circuit 28 and the luminance signals are further fed to a light-control circuit 23. Initial synchronizing signals are fed from the initial signal processing circuit 55 to a timing control circuit 30 in accordance with the output-timing of the luminance signals.

In the latter signal processing circuit 28, a given process is performed for the input video signals, and the processed video signals are output to the monitor 32 as NTSC composite signals, S-video signals, and R, G, B component signals. Thus, the subject image is displayed on the monitor 32.

A system control circuit 22 including a CPU 24 (Central Processing Unit) controls the video-processor 10 and outputs control signals to the light-control circuit 23, the lamp controller 11A, the latter signal processing circuit 28, and soon. Clock pulses are output from the timing control circuit 30 to each circuit in the video-processor 10, and synchronizing signals to be interleaved in the video signals are fed from the timing control circuit 30 to the latter signal processing circuit 28.

A stop 16 is provided between the incident surface 51A and the collecting lens 14 to adjust an amount of light illuminating the subject S, and it opens and closes by using a motor 18. The light-control circuit 23 controls the stop 16 such that the brightness of the subject image on the monitor 32 is maintained at a proper brightness. Namely, the light-control circuit 23 outputs control signals to a motor-driver 20 in accordance with the input luminance signals, and then the motor 18 is driven by the motor driver 20, so that the stop 16 opens or closes by a given amount.

The video-scope 50 has a scope-controller 56 that controls the video-scope 50, and an EEPROM (Electronic Erasable Programmable ROM) 57. A program associated with a control of the video-scope 50 is stored in the ROM 58. Further, a series of register setting data, which is associated with the signal processes performed in the initial signal processing circuit 55, is stored in the EEPROM 57. The scope-controller 56 controls the initial signal processing circuit 55, and reads the series of given register setting data from the EEPROM 57 and writes the register setting data in a register 55A in the initial signal processing circuit 55. The initial signal processing circuit 55 processes the image signals in accordance with the written register setting data. When the video-scope 50 is connected to the video-processor 10, various data is transmitted between the scope-controller 56 and the system control circuit 22. Namely, the data associated with the characteristic of the video-scope 50 is transmitted to the system control circuit 22, whereas the data associated with the characteristic of the video-processor 10 is transmitted to the scope-controller 56. As described above, in this embodiment, various types video-processors are prepared and one video-processor is selectively connected to the video-scope 50.

A setting switch (not shown) for setting a base luminance level is provided on the front panel 96 of the video-processor 10. When the user operates the setting switch, an operational signal is fed to the system control circuit 22. The base luminance level data is temporarily stored in a RAM (Random Access Memory) 26, and is fed to the light-control circuit 23 when required. When the keyboard 34 is operated by the user to display character information, such as a patient's information, the operational signal is fed to the system control circuit 22. Character signals are generated on the basis of the operational signal and are superimposed into the video signals at the latter signal processing circuit 28, so that the character information is displayed on the monitor 32 with the subject image.

Figure 2:
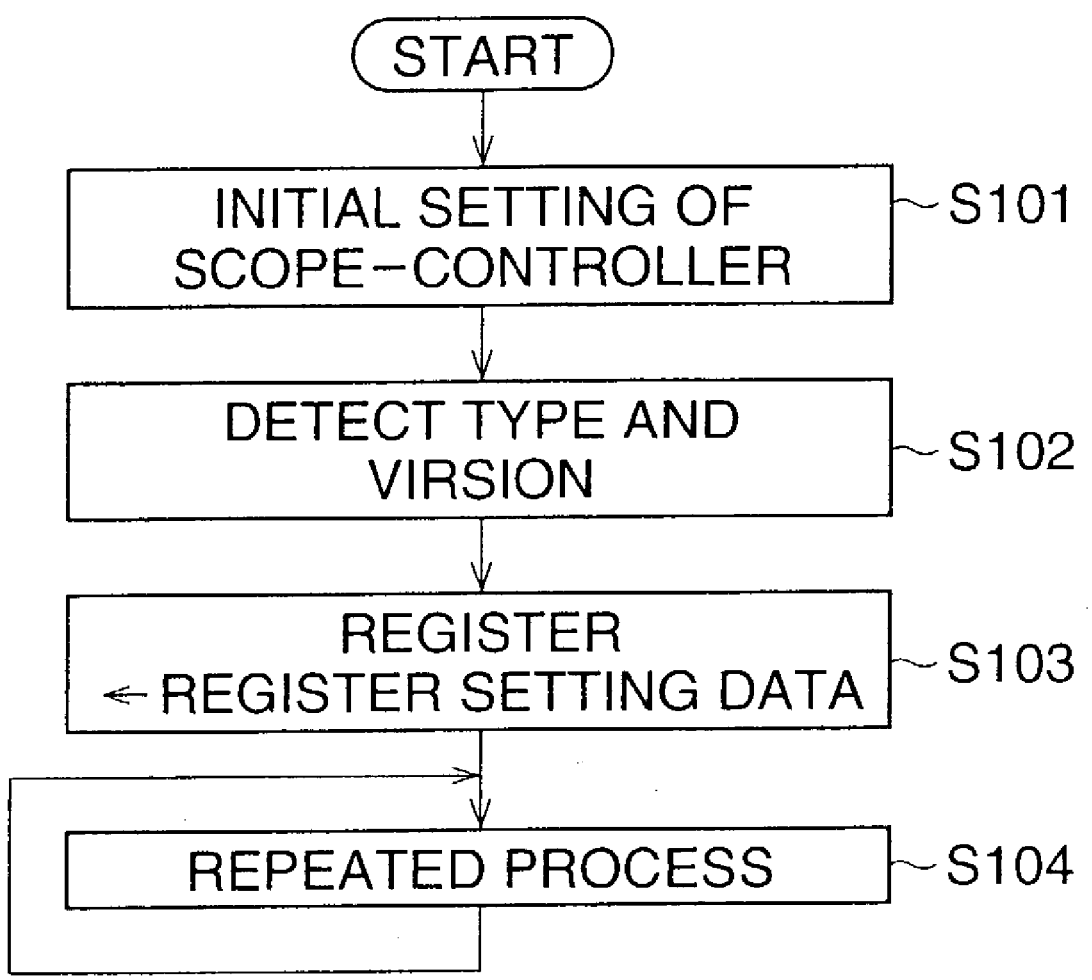
FIG. 2 is a view showing the setting process performed by a scope-controller.
Figures 3, 4:
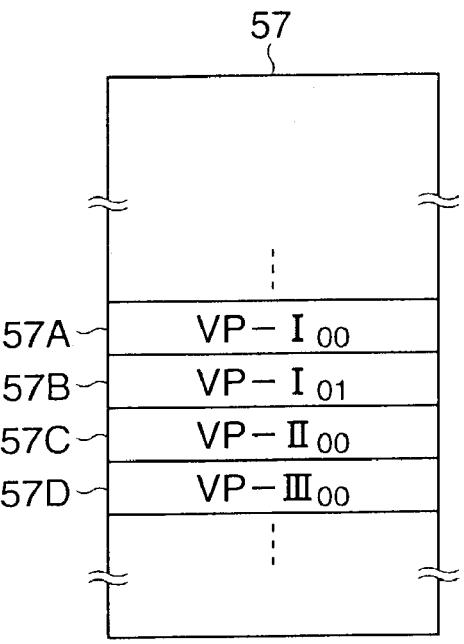
FIG. 3 is a code table of plural types of video-processors.
FIG. 4 is a view showing an address map.

FIG. 2 is a view showing the setting process performed by the scope-controller 56. FIG. 3 is a code table of plural types of video-processors. FIG. 4 is a view showing an address map. When the video-scope 50 is connected to the video-processor 10, the electric power in the video-scope 50 is turned ON, and the setting process is started.

In Step S101, initial setting for the scope-controller 56 is performed. In Step S102, the type number of video-processor 10 (hereinafter, called "primary type number"), to which the video-scope 50 is connected, and any improvement number (hereinafter, called "version number") according to that connected video-processor 10 are detected.

In this embodiment, three primary types of video-processors are prepared and one of them is selectively connectable to the video-scope 50. The primary type number is a number that characterizes the type of video-processor. Each type vide-processor has a peculiar characteristic with respect to the collecting optical system including the collecting lens 14 and the collecting mirror 12B in the lamp unit 12, and the latter signal processing circuit 28. Hereinafter, the three primary types video-processors are respectively designated as "VP-I", "VP-II", and "VP-III".

Further, in this embodiment, an improved product of the video-processor 10 is prepared and connectable to the video-scope 50, and the version number is assigned to each type video-processor to distinguish the original product and the improved product. Herein, the version number "00, 01, 02, . . . " is added to the primary type number "I, II, III, . . . " by suffix. The version number "00" corresponds to the original product, and the version number "01", "02", . . . are assigned in accordance with the improved order. Note that, in this embodiment, the version number is optional type number and the improved video-processor is prepared for only the first primary type processor "VP-I".

The video-processor "VP-$I_{00}$" is different from the video-processor "VP-$II_{00}$" mainly with respect to the characteristic of the collecting lens 14 in this embodiment. The collecting lens 14 provided in the type "VP-$I_{00}$" video-processor 10 is a high-performance collecting lens effectively collecting the light from the lamp 12A, whereas the collecting lens 14 in the type "VP-$II_{00}$" video-processor 10 is a normal collecting lens, which is inferior to the high-performance collecting lens. Consequently, the spectrum characteristic of the light that illuminates the subject S is different between the type "VP-$II_{00}$" and "VP-$I_{00}$" video-processors. Therefore, when the type "VP-$II_{00}$" video-processor 10 is used, the light, emitted from the end surface 51B of the fiber-optic bundle 51, includes light components with blue color, compared to the type "VP-$I_{00}$" video-processor 10. The matrix coefficients of R, G, B, and the gain values of R and B, which are included in the register setting data, are defined in accordance the characteristics of the collecting lens 14.

On the other hand, the type "VP-$I_{00}$" video-processor 10 is different from the video-processor "VP-$III_{00}$" with respect to mainly the characteristic of the latter signal processing circuit 28 in this embodiment. In the case of the type "VP-$I_{00}$" of video-processor 10, the gamma correction process and the contour emphasizing process are not performed in the latter signal-processing circuit 28 but performed in the initial signal processing circuit 28, whereas, in the case of the type "VP-$III_{00}$" video-processor 10, those processes are performed in the latter signal processing circuit 28. Therefore, the gamma correction value and the contour emphasizing coefficient for the type "$III_{00}$" video-processor 10 are defined such that the gamma correction process and the contour emphasizing process are not performed in the initial signal processing circuit 55.

Further, the version "VP-$I_{01}$" video-processor 10 is different from the version "VP-$I_{00}$" video-processor 10 with respect to the coating characteristic of the collecting mirror 12B in this embodiment. Consequently, the spectrum characteristic of the light that illuminates the subject S is different between the versions "VP-$I_{00}$" and "VP-$I_{01}$". The R, B gain values are defined in accordance with the coating characteristic corresponding to the version number.

In this embodiment, video-processor characteristic data indicating the primary type number and the version number of the video-processor 10 is stored in a ROM 25 in the system control circuit 22 in each primary type and version of video-processor 10. The video-processors "VP-$I_{00}$", "VP-$I_{01}$", "VP-$II_{00}$", and "VP-$III_{00}$" are respectively designated as code data "$10_H$, $11_H$, $20_H$, and $30_H$ (See FIG. 4). When the video-scope 50 is connected to the video-processor 10, the code data is transmitted from the video-processor 10 to the scope-controller 56. Then, in Step S102, the scope controller 56 detects the primary type number and version number of the connected video-processor 10 in accordance with the transmitted code data. After Step S102 is performed, the process goes to Step S103.

In the EEPROM 57, a series of register setting data 57A, 57B, 57C, and 57D are stored in accordance with the primary type number and version number of the video-processor 10 (See FIG. 3).

The series of register setting data 57A, 57B, 57C, and 57D respectively correspond to the video-processor "VP-$I_{00}$", "VP-$I_{01}$", "VP-$II_{00}$", and "VP-$III_{00}$". Each of the series of register setting data 57A, 57B, 57C, and 57D is suitable data for the corresponding video-processor. Namely, the values of each register setting data are set in accordance with the characteristics of the collecting mirror 12B, the collecting lens 14, and the latter signal processing circuit 28 in the corresponding video-processor. The capacity of each register setting data is 30 bytes. In Step S103, one of the register setting data 57A to 57D, corresponding to the primary type number and version of the connected video-processor 10, is read from the series of register setting data stored in the EEPROM 57, and the read register setting data is written in the register 55A. In Step S104, a given process including a command process is repeatedly performed until the electric power in the video-scope 50 is turned OFF.

In this way, in this embodiment, a series of register setting data 57A to 57 D is stored in the EEPROM 57. When the video-scope 50 is connected to the video-processor 10, the primary type and version of the connected video-processor 10 is detected, and the corresponding register setting data is read from the EEPROM 57 and written in the register 55A. Thus, the color subject image is properly reproduced for any type of video-processor, so that the operator can operates or diagnosis properly.

The video-processor 10 may be constructed of an independent light source and an independent signal processor in place of the united video-processor shown in the present embodiment.

When other characteristics such as the signal timing are different in each type of video-processor in addition to the collecting optical system and the latter signal processing circuit, the register setting data may be set in accordance with the other characteristics.

Finally, it will be understood by those skilled in the art that the foregoing description is of preferred embodiments of the device, and that various changes and modifications may be made to the present invention without departing from the spirit and scope thereof.

The present disclosure relates to subject matters contained in Japanese Patent Application No.2002-016496 (filed on Jan. 25, 2002) which is expressly incorporated herein, by reference, in its entirety.

The invention claimed is:

1. A video-scope of an electronic endoscope apparatus, which has an image sensor and which is selectively connectable to plural types of video-processors, the video-scope comprising:

a memory that stores a plurality of register setting data, said plurality of register setting data being associated with signal processes for processing image signals read from said image sensor, said plurality of register setting data associated with the plural types of video-processors, the register setting data being defined in accordance with at least one of a characteristic of a signal processing circuit that is provided in each of the plural types of video-processors, a characteristic of a light source unit that has a light source and a collecting mirror and a characteristic of a collecting optical system that collects light from the light source so that the light enters a fiber-optic bundle provided in said video-scope;

a signal processor that is provided in said video-scope and that processes the image signals;

a video-processor detector that detects type information of a video-processor connected to said video-scope; and a data setter that reads register setting data corresponding to the detected type information from said memory; and that writes the register setting data in a register provided in said signal processor, wherein said signal processor processes the image signals in accordance with the register setting data in said register.

2. The video-scope of claim 1, wherein said memory is an erasable memory.

3. The video-scope of claim 1, wherein the plurality of register setting data is associated with primary types of video-processors and improved video-processors, said video-processor detector detects a primary type number and a version number assigned to said improved video-processors, said data setter reads register setting data associated with the primary type number and the version number of said connected video-processor from said memory, and writes the read register setting data in said register.

4. An apparatus for setting data associated with signal processes performed in a video-scope of an electronic endoscope apparatus, the apparatus comprising:

a memory that stores a plurality of register setting data, which is associated with the signal processes said plurality of register setting data associated with plural types of video-processors, the register setting data being defined in accordance with at least one of a characteristic of a signal processing circuit that is provided in each of the plural types of video-processors, a characteristic of a light source unit that has a light source and a collecting mirror and a characteristic of a collecting optical system that collects light from the light source so that the light enters a fiber-optic bundle provided in said video-scope;

a video-processor detector that detects type information of a video-processor connected to the video-scope; and a data setter that reads register setting data corresponding to the detected type information from said memory, and writes the register setting data in a register in a signal processor that processes image signals read from an image sensor provided in said video-scope, wherein said signal processor processes the image signals in accordance with the register setting data in said register.

5. The apparatus of claim 4, wherein said memory is an erasable memory.

6. The apparatus of claim 4, wherein the plurality of register setting data is associated with primary types of video-processors and improved video-processors, said video-processor detector detects a primary type number and a version number assigned to the improved video-processors, said data setter reads register setting data associated with the primary type number and the version number of the connected video-processor from the memory, and writes the read register setting data in the register.

7. A computer program product embodied in computer readable medium for setting data associated with signal processes performed in a video-scope of an electronic endoscope apparatus, the computer program product comprising:

a video-processor detector that detects type information of a video-processor connected to the video-scope; and a data setter that reads register setting data corresponding to the detected type information from a memory that stores a plurality of register setting data, which is associated with the signal processes, said plurality of register setting data associated with plural types of video-processors, said data setter writing the register setting data in a register in a signal processor that processes image signals read from an image sensor provided in said video-scope, the register setting data being defined in accordance with at least one of a characteristic of a signal processing circuit that is provided in each of the plural types of video-processors, a characteristic of a light source unit that has a light source and a collecting mirror, and a characteristic of a collecting optical system that collects light from the light source so that the light enters a fiber-optic bundle provided in said video-scope, wherein said signal processor processes the image signals in accordance with the register setting data in said register.

8. The computer program product of claim 7, wherein said memory is a erasable memory.

9. The computer program product of claim 7, wherein the plurality of register setting data is associated with primary types of video-processors and improved video-processors, said video-processor detector detects a primary type number and a version number assigned to said improved video-processors, said data setter reads register setting data associated with the primary type number and the version number of said connected video-processor from said memory, and writes the read register setting data in said register.

10. A method for setting data associated with signal processes performed in a video-scope of an electronic endoscope apparatus, the method comprising:

detecting type information of a connected video-processor;

reading register setting data corresponding to the type of video-processor connected to the video-scope from a memory that stores a plurality of register setting data, which is associated with the signal processes, the plurality of register setting data associated with plural types of video-processors, the register setting data being defined in accordance with at least one of a characteristic of a signal processing circuit that is provided in each of the plural types of video-processors, a characteristic of a light source unit that has a light source and a collecting mirror, and a characteristic of a collecting optical system that collects light from the light source so that the light enters a fiber-optic bundle provided in the video-scope; and writing the register setting data in a register in a signal processor that processes image signals read from an image sensor provided in the video-scope, the signal processor processing the image signals in accordance with the register setting data in the register.

11. The method of claim 10, wherein the memory is an erasable memory.

12. The method of claim 10, wherein the plurality of register setting data is associated with primary types of video-processors and improved video-processors, the detecting detects a primary type number and a version number assigned to the improved video-processors, the reading reads register setting data associated with the primary type number and the version number of the connected video-processor from the memory, and writes the read register setting data in the register.

* * * * *